United States Patent [19]
Fotouhi et al.

[11] Patent Number: 5,914,632
[45] Date of Patent: Jun. 22, 1999

[54] NEGATIVE CHARGE PUMP CIRCUIT

[75] Inventors: Bahram Fotouhi, Cupertino; Roubik Gregorian, Saratoga, both of Calif.

[73] Assignee: Exar Corporation, Fremont, Calif.

[21] Appl. No.: 08/808,813

[22] Filed: Feb. 28, 1997

[51] Int. Cl.⁶ .................................................. G05F 1/10
[52] U.S. Cl. ...................... 327/537; 327/536; 327/589; 327/390; 363/59; 363/60
[58] Field of Search ............................. 327/589, 536, 327/537, 62, 430, 431, 390; 363/59, 60; 326/30, 31, 33, 34

[56] References Cited

U.S. PATENT DOCUMENTS

| | | | |
|---|---|---|---|
| 4,636,930 | 1/1987 | Bingham et al. | 363/60 |
| 4,679,134 | 7/1987 | Bingham et al. | 363/61 |
| 4,777,577 | 10/1988 | Bingham et al. | 363/60 |
| 4,797,899 | 1/1989 | Fuller et al. | 375/7 |
| 4,807,104 | 2/1989 | Floyd et al. | 363/59 |
| 4,809,152 | 2/1989 | Bingham et al. | 363/61 |
| 4,897,774 | 1/1990 | Bingham et al. | 363/61 |
| 4,947,064 | 8/1990 | Kim et al. | 307/594 |
| 4,999,761 | 3/1991 | Bingham et al. | 363/60 |
| 5,043,858 | 8/1991 | Watanabe | 363/61 |
| 5,258,662 | 11/1993 | Skovmand | 307/296.3 |
| 5,426,334 | 6/1995 | Skovmand | 327/427 |
| 5,744,997 | 4/1998 | Kang et al. | 327/537 |

*Primary Examiner*—Kenneth B. Wells
*Assistant Examiner*—Minh Nguyen
*Attorney, Agent, or Firm*—Townsend and Townsend and Crew LLP

[57] ABSTRACT

A charge pump circuit that is capable of generating a voltage that is greater in absolute magnitude than that of the substrate voltage Vsub in circuits where the substrate cannot be pumped to a voltage that is greater in absolute magnitude than Vsub is disclosed. Various innovative circuit techniques are used to implement a, for example, negative charge pump circuit in an N-well CMOS process with all PMOS transistors. The negative charge pump circuit according to the present invention can reliably drive on-chip transmission line termination switches.

18 Claims, 3 Drawing Sheets

NEGATIVE CHARGE PUMP CIRCUIT

BACKGROUND OF THE INVENTION

The present invention relates in general to integrated circuits (ICs), and in particular to a charge pump circuit that from a primary voltage source generates a secondary voltage that is larger in absolute magnitude.

Many electronic systems require more than a single power supply voltage level for operation. For example, certain types of non-volatile memory circuits that may typically use a single 5 volt supply as the primary source of power, often also require higher voltages of, e.g., 10 to 15 volts for programming or erasing functions. Similarly, circuits developed for use in communication and networking systems often require voltages other than the primary supply voltage to, for example, meet certain interface specifications.

Depending on the power requirements of such secondary supply voltages, it is desirable to generate them internally from the primary power supply. This eliminates the need for additional externally provided power supplies. To this end, voltage multiplying or charge pump circuits have been developed that generate the higher voltages from the primary supply voltage.

Charge pump circuits take advantage of the charge storing capability of capacitors to, for example, double the level of a primary supply voltage by bootstrapping. A typical example of a charge pump circuit for use in communication circuits is disclosed in U.S. Pat. No. 4,797,899. There, a network of switches and capacitors operate to generate voltages twice that of the primary Vdd supply in both positive (+2 Vdd) and negative (−2 Vdd) directions.

In certain applications, it may be necessary to generate a voltage that is more negative than the substrate voltage Vss, and the substrate cannot be pumped to a more negative voltage than Vss. Driving a transmission line termination switch, for example, may give rise to such a condition. Consider a computing system such as a personal computer (PC) or a computer workstation within which an IC may receive input signals with amplitude of, for example, ±10 volts. FIG. 1 illustrates a transmission line 100 carrying a ±10 volt signal to an IC that may be powered by ±5 volt supplies. Transmission line 100 is terminated by a conventional termination circuit 102. Termination circuit 102 includes a pair of 50Ω resistors separated by a termination switch 104.

It is desirable to integrate termination switch 104 inside the receiver IC. FIG. 2A shows one example of how termination switch 104 can be implemented by a complementary metal-oxide-semiconductor (CMOS) switch including an N-channel transistor (NMOS) 200 and a P-channel transistor (PMOS) 202. The CMOS switch, however, will not operate properly if the IC is powered by ±5 volt supplies and the input signal range is ±10 volts. Given a p-type substrate that is biased at −5 volts, a negative voltage of −7 or −10 volts applied to the source/drain terminals of NMOS 200 would turn on the source/drain junction diodes of the transistor as shown in FIG. 2B. This may cause severe over-current conditions due to latch-up. To avoid this condition, the substrate voltage must be reduced to as low as the lowest voltage in the chip which may be as low as −12 volts. Given a +5 volt positive supply, this would place 17 volts across transistor source/drain junctions. For a typical CMOS process 17 volts approaches junction breakdown voltage levels. Reducing substrate voltage down to such levels therefore is not an option.

Because PMOS 202 is inside a separate n-well (not shown) that can be independently biased, given the above voltage conditions, switch 104 can be implemented using only a single PMOS transistor. However, the circuit driving the gate terminal of PMOS 202 would need to operate from a different power supply. This is because the ±5 volt internal supply levels will not be able to turn PMOS 202 on and off with ±10 volts at its source/drain terminals. Voltage levels of, for example, ±12 volts would be required to drive the gate of PMOS 202. An internal charge pump circuit is typically used to generate the necessary voltages from the power supplies.

Conventional charge pump circuits such as those described in the above-referenced U.S. Pat. No. 4,797,899, use NMOS transistors to generate the output voltage. Similar constraints as described above with respect to breakdown voltages, threshold voltages and latch-up conditions would therefore apply to the NMOS transistor in the charge pump circuit. Thus, it is not possible to use conventional charge pump circuitry that include NMOS transistors in applications such as described above.

There is therefore a need for a charge pump circuit that is capable of generating a voltage more negative than the substrate voltage Vss in a circuit where the substrate cannot be pumped to more negative than Vss. A similar need exists for a charge pump circuit that operates with the opposite polarity.

SUMMARY OF THE INVENTION

The present invention provides a charge pump technique that can generate a voltage having an absolute magnitude greater than that of the substrate voltage Vsub in circuits where the substrate cannot be pumped to a voltage that is greater in absolute magnitude than Vsub. In the case of an N-well CMOS process, for example, the charge pump circuit according to the present invention is implemented using PMOS transistors. Various circuit techniques have been developed by this invention to enable the implementation of an all PMOS negative charge pump circuit for the embodiment using an N-well CMOS process. Such an all PMOS charge pump circuit is capable of generating voltages more negative than the substrate voltage Vsub in a circuit where the substrate cannot be pumped to more negative than Vsub.

Accordingly, in one embodiment, the present invention provides a charge pump circuit including a first MOS transistor having a first source/drain terminal coupled to a reference voltage, a gate terminal coupled to a first clock signal, and a second source/drain terminal, a second MOS transistor having a first source/drain terminal coupled to the second source/drain terminal of the first MOS transistor, a gate terminal coupled to a second clock signal, and second source/drain terminal, a third MOS transistor having a first source/drain terminal coupled to the second source/drain terminal of the second MOS transistor, a gate terminal coupled to the first clock signal, and a second source/drain terminal, a first capacitor coupled between the second source/drain terminal of the first MOS transistor and the second source/drain terminal of the third MOS transistor, and a fourth MOS transistor having a first source/drain terminal coupled to said second source/drain terminal of the third MOS transistor, a gate terminal coupled to a drive circuit, and a second source/drain terminal coupled to an output of the charge pump circuit. The drive circuit includes a boosting capacitor coupled to a fifth MOS transistor. A bulk terminal of each of the first, second, third, and fifth MOS transistors couple to their respective first source/drain terminals, while a bulk terminal of the fourth MOS transistor is switched between second and a third reference nodes.

In another embodiment, the present invention provides a termination switch for a transmission line including a MOS transistor having first and second source/drain terminals coupled to first and second termination resistors, respectively, and a gate terminal coupled to an output of the charge pump circuit of the present invention.

A better understanding of the nature and advantages of the present invention may be had with reference to the detailed description and drawings below.

DESCRIPTION OF SPECIFIC EMBODIMENTS

Figure 1:
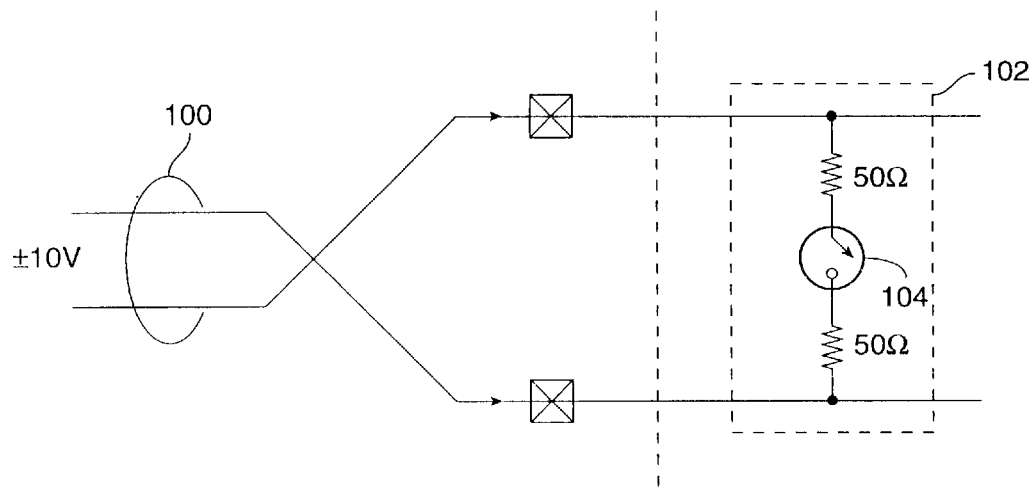
FIG. 1 shows a conventional termination circuit for a transmission line.
Figure 2A:
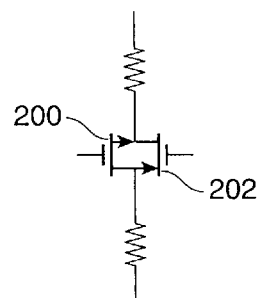
FIGS. 2A and 2B show a CMOS transmission gate implementing a transmission line termination switch and the junction diodes of a NMOS transistor, respectively.
Figure 2B:
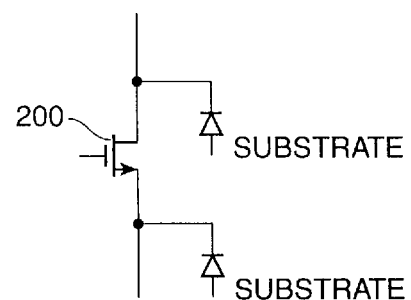
Figure 3:
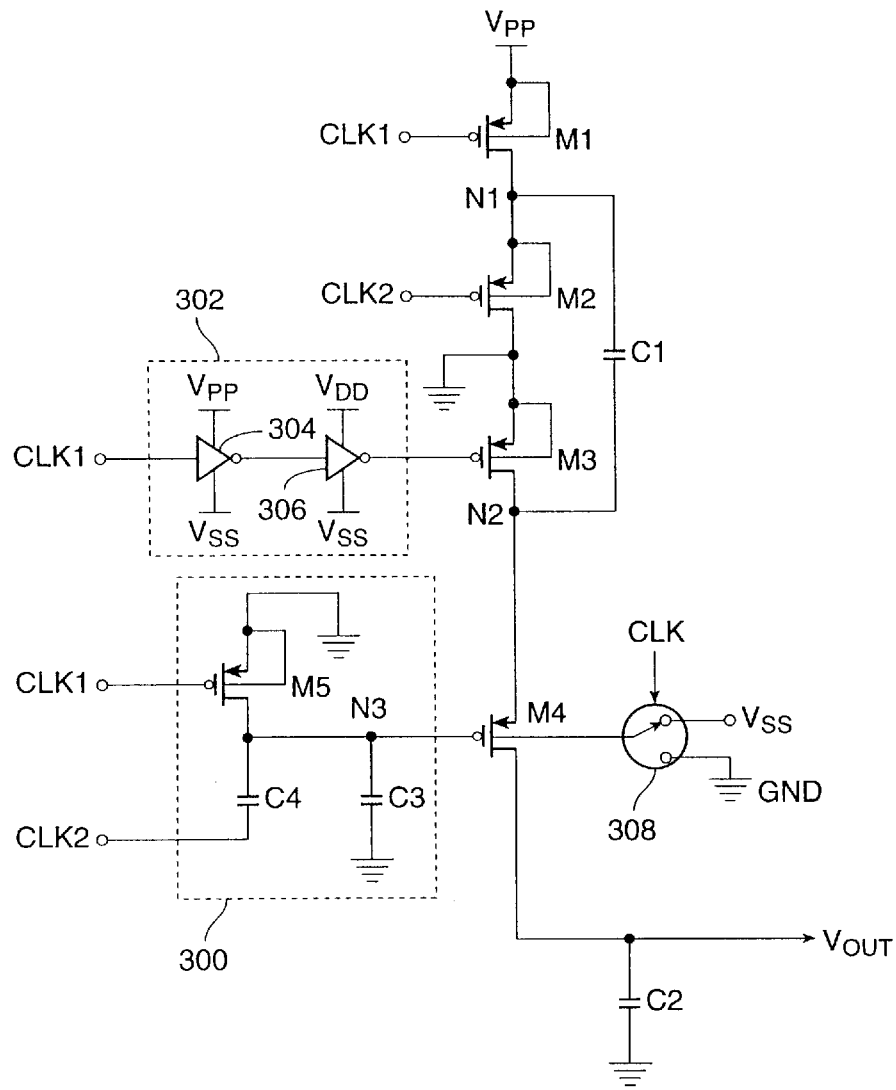
FIG. 3 is a circuit schematic of an all PMOS negative charge pump circuit according to one embodiment of the present invention.

Referring to FIG. 3, there is shown a circuit schematic of an exemplary embodiment of a charge pump circuit according to the present invention. In this example, the charge pump circuit is implemented in a CMOS process with a P-type substrate where PMOS devices reside in N-type wells. Thus, the resulting charge pump circuit is a negative charge pump. It will be apparent to those skilled in the art that a positive charge pump circuit based on the principle teachings of the present invention can be implemented in a P-well CMOS process. Such a positive charge pump circuit would use NMOS transistors and would provide the same advantages as those described below in connection with the exemplary negative charge pump. The all PMOS negative charge pump circuit implementation described below is therefore for illustrative purposes only and is not limiting.

The circuit of FIG. 3 includes primary positive and negative power supplies Vdd and Vss of, for example, +6 v and –6 v, respectively. The circuit also includes a secondary higher positive voltage of Vpp of, for example, 12 volts. The circuit includes a first PMOS transistor M1 that connects between Vpp and node N1, and receives a clock signal CLK1 at its gate terminal. A second PMOS transistor M2 connects between node N1 and ground, and receives a clock signal CLK2 at its gate terminal. Clock signals CLK1 and CLK2 are preferably non-overlapping complementary clock (square-wave) signals that are generated by oscillator circuitry (not shown). The drivers for the signals CLK1 and CLK2 are powered by the higher voltage Vpp to enable CLK1 and CLK2 signals to have high enough voltages to turn the transistors on and off.

The circuit further includes a third PMOS transistor M3 that connects between ground and node N2, and receives via buffer circuit 302 clock signal CLK1 at its gate terminal. Buffer circuit 302 includes a first inverter 304 that is powered by Vpp and Vss, and a second inverter 306 whose positive power supply is connected to Vdd instead of Vpp. A fourth PMOS transistor M4 connects between node N2 and the output of the circuit Vout. The gate terminal of PMOS M4 is driven by a driver circuit 300 which includes a PMOS transistor M5, a bootstrap capacitor C4 and a voltage shift capacitor C3. A capacitor C1 connects between nodes N1 and N2, and a capacitor C2 connects between the output of the charge pump circuit Vout and ground.

All PMOS transistors reside inside dedicated N-wells (not shown) that form the bulk of each transistor. The bulk terminal for each of PMOS transistors M1, M2, M3, and M5 connects to the respective source terminal to eliminate bulk effect. The bulk terminal for PMOS transistor M4, however, is switched between ground and Vss depending on the clock phase. A switch 308 receives the clock information and connects the bulk of M4 to Vss or ground. Switch 308 can be implemented using a pair of MOS transistors.

The operation of the negative charge pump circuit of the present invention will be described hereinafter using exemplary voltage levels of Vdd=6 v, Vss=–6 v, and Vpp=12 v. The circuit that generates clock signals CLK1 and CLK2 runs between Vpp=12 v and Vss=–6 v. When CLK1 is at a low level (–6 v) and CLK2 at a high level (12 v), PMOS transistors M1 and M3 are turned on, and PMOS transistor M2 is turned off. This charges node N1 to Vpp and discharges node N2 to ground, charging capacitor C1 to Vpp or 12 volts. During this phase of the clock, PMOS transistor M5 is also turned on discharging node N3 to ground. With both its source (node N2) and gate (node N3) terminals grounded, PMOS transistor M4 is thus turned off, and the output Vout is disconnected from the circuit.

During the next phase of the clock when CLK1 is high and CLK2 is low, PMOS transistors M1 and M3 turn off, and PMOS transistor M2 turns on. Transistor M2 thus connects node N1 to ground. As the top plate of capacitor C1 (i.e., node N1) moves from 12 volts to ground, its bottom plate (node N2) is pulled from ground toward –12 volts. Because the drain terminal of PMOS M3 (i.e., node N2) can drop to as low as –12 volts, its gate is driven by a clock signal having smaller magnitude to stay within typical CMOS process limitations. Buffer circuit 302 ensures that the clock signal at the gate of PMOS M3 ranges from Vss=–6 v to Vdd=+6 v (or ground) instead of Vss to Vpp=12 v. This avoids subjecting the gate-to-drain junction of PMOS M3 to voltages as high as 12+12=24 volts.

This second phase of the clock also turns off PMOS transistor M5 (CLK1=high). As the signal CLK2 at the bottom plate of capacitor C4 moves from high (12 v) to low (–6 v), node N3 is bootstrapped in the negative direction from its previous level at ground by 12+6=18 volts multiplied by the ratio C4/(C3+C4). The purpose of C3 is to attenuate the voltage at node N3 which would otherwise be large enough to potentially cause damage to the gate of PMOS transistor M4. Thus, driver circuit 300 operates such that during this second phase, PMOS transistor M4 is turned on (and remains in ohmic region) even though its source terminal (node N2) is at a low voltage of –12 v. With PMOS transistor M4 turned on, capacitors C1 and C2 are placed in series and begin charge sharing, and the output voltage Vout exponentially moves toward –12 volts.

Because each one of the source/drain terminals of PMOS transistor M4 may be at –12 volts during different clock phases, connecting the bulk terminal of the transistor to its source would run the risk of forward biasing the source-bulk diode. Connecting the bulk terminal of PMOS M4 to the most positive voltage would not work either since body effect would significantly increase the threshold voltage and thus the on resistance of PMOS M4. The circuit of the present invention connects the bulk terminal of PMOS M4 to Vss when M4 is on, and to ground when M4 is off. This ensures that the inherent source-bulk diode of PMOS M4 is not turned on when the source terminal of PMOS M4 (node N2) is at ground, and body effect is minimized when the source terminal of PMOS M4 (node 2) is at −12 volts. Switch 308 can be implemented by a pair of MOS transistors whose gate terminals are controlled by the clock signals CLK1 and CLK2.

Figure 4:
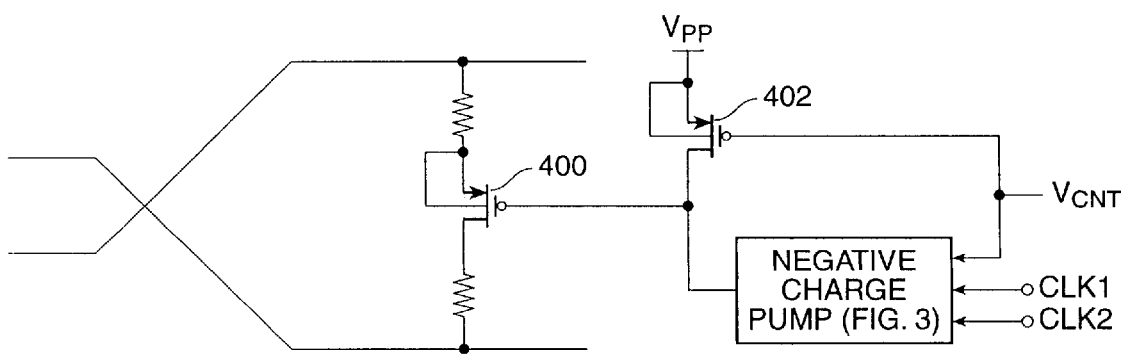
FIG. 4 shows a transmission line termination circuit according to the present invention.

Referring to FIG. 4, there is shown a PMOS transistor 400 that implements a transmission line termination switch. In this example, the transmission line requires the signal driving PMOS transistor 400 to swing ±12 volts. However, −12 volts is lower than the most negative voltage Vss=−6 v that biases the substrate for the entire circuit. A typical inverter with an NMOS pull down transistor would not be able to drive transistor 400. With −12 volts at its output, the inherent bulk-drain diode of such an NMOS would be forward biased. Therefore, PMOS 400 is driven by a PMOS transistor 402 that connects to Vpp (12 v) for the pull-up device, and the negative charge pump circuit of FIG. 3 that generates −12 volts at its output for the pull-down device.

In the circuit of FIG. 4, when the switch control signal Vcnt is low, PMOS transistor 402 is turned on driving the gate terminal of PMOS 400 to Vpp or 12 volts, and the charge pump circuit is disabled. When Vcnt is high, PMOS transistor 402 is turned off and the charge pump circuit is enabled driving the gate terminal of PMOS 400 to −12 volts. To disable the charge pump circuit, the oscillator circuit supplying the clock signals can be deactivated. This will deactivate clock signals CLK1 and CLK2 and PMOS transistors M1, M2, M3, and M4.

Figure 5:
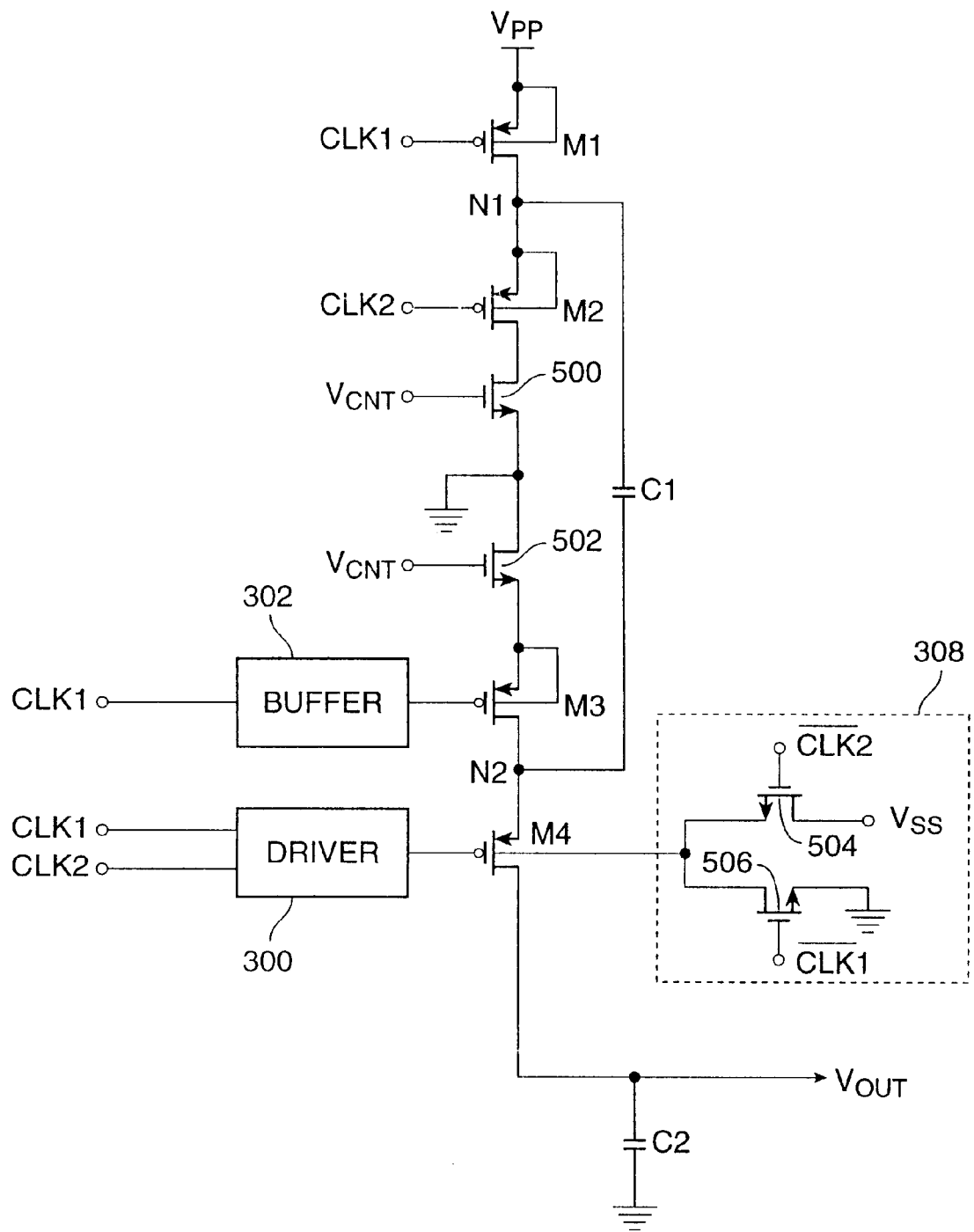
FIG. 5 is a circuit schematic of a negative charge pump circuit according to one embodiment of the present invention whose output can be deactivated to drive the termination circuit of FIG. 4.

Alternatively, the charge pump circuit can be disabled by disconnecting it from ground. FIG. 5 shows how this could be accomplished. A first NMOS transistor 500 connects in series between PMOS M3 and ground, and a second NMOS transistor 502 connects in series between PMOS M2 and ground. The circuit is otherwise identical to that shown in FIG. 3 with the same reference numerals identifying the same components. FIG. 5 also shows a transistor implementation for switch 308 wherein two NMOS transistors 504 and 506 connect the bulk terminal of PMOS transistor M4 to ground and Vss, respectively. The gate terminals of NMOS transistors 504 and 506 are controlled by the inverse of clock signals CLK1 and CLK2, respectively.

By connecting the gate terminals of the two NMOS transistors 500 and 502 to Vcnt, the entire charge pump circuit can be disconnected from ground when the two NMOS transistors are turned off (Vcnt=low). Simple NMOS transistors 500 and 502 can be used for this purpose since these nodes do not undergo high voltage conditions. The circuit of the present invention can thus reliably drive the gate terminal of termination switch to voltages lower than the most negative power supply voltage available in the circuit, allowing the termination switch to be integrated on the same chip as the rest of the circuit.

In conclusion, the present invention offers a charge pump technique that can generate a voltage having an absolute magnitude greater than that of the substrate voltage Vsub in circuits where the substrate cannot be pumped to a voltage that is greater in absolute magnitude than Vsub. An exemplary embodiment of a negative charge pump circuit in an N-well CMOS process is implemented using PMOS transistors. Various innovative circuit techniques enable the implementation of an all PMOS negative charge pump circuit that is capable of generating voltages more negative than the substrate voltage Vsub in a circuit where the substrate cannot be pumped to more negative than Vsub. The exemplary negative charge pump circuit can reliably drive on-chip transmission line termination switches.

While the above is a complete description of the preferred embodiment of the present invention, it is possible to use various alternatives, modifications and equivalents. In particular, it is to be understood the voltage levels specified for the various power supply levels of Vss, Vdd, Vpp and ground are for illustrative purposes only and are not restrictive. Reference levels other than the ones used herein can be used without departing from the spirit of the invention. Furthermore, the circuit techniques of the present invention can be used to implement a positive charge pump circuit in a P-well CMOS process having an N-type substrate. Such a positive charge pump circuit would be made up of NMOS transistors that reside in independent P-type well regions. The principles of operations would otherwise be essentially the same as in the case of the negative charge pump circuit. Therefore, the scope of the present invention should be determined not with reference to the above description but should, instead, be determined with reference to the appended claims, along with their full scope of equivalents.

What is claimed is:

1. A charge pump circuit fabricated on a semiconductor substrate, comprising:

first MOS transistor having a first source/drain terminal coupled to a reference voltage, a gate terminal coupled to a first clock signal, and a second source/drain terminal;

second MOS transistor having a first source/drain terminal coupled to said second source/drain terminal of said first MOS transistor, a gate terminal coupled to a second clock signal, and a second source/drain terminal coupled to ground;

third MOS transistor having a first source/drain terminal coupled ground, a gate terminal coupled to said first clock signal, and a second source/drain terminal;

first capacitor coupled between said second source/drain terminal of said first MOS transistor and said second source/drain terminal of said third MOS transistor;

fourth MOS transistor having a first source/drain terminal coupled to said second source/drain terminal of said third MOS transistor, a gate terminal, a second source/drain terminal coupled to an output of the charge pump circuit, and a bulk terminal switchably coupled between ground and a first potential, and a drive circuit coupled to the gate terminal of the fourth MOS transistor and configured to supply a boosted clock signal to the gate terminal of the fourth MOS transistor, wherein, the semiconductor substrate is biased to a substrate potential and the output of the charge pump circuit generates a voltage that is larger in absolute magnitude than the substrate potential.

2. The charge pump circuit of claim 1 wherein said drive circuit comprises:

a fifth MOS transistor having a first source/drain terminal coupled to ground, a gate terminal coupled to said first clock signal, and a second source/drain terminal coupled to said gate terminal of said fourth MOS transistor; and a bootstrapping capacitor having a first terminal coupled to said second source/drain terminal of said fifth MOS transistor, and a second terminal coupled to said second clock signal.

3. The charge pump circuit of claim 2 wherein said drive circuit further comprises a voltage shift capacitor having a first plate coupled to said first plate of said bootstrapping capacitor, and a second terminal coupled to ground.

4. The charge pump circuit of claim 3 wherein the charge pump circuit includes a positive power supply Vdd, a negative power supply Vss, and wherein said reference voltage is a second positive voltage that is higher in magnitude than said positive power supply Vdd.

5. The charge pump circuit of claim 4 further comprising a second capacitor having a first terminal coupled to said output of the charge pump circuit, and a second terminal coupled to ground.

6. The charge pump circuit of claim 5 wherein said first and second clock signals are non-overlapping complementary square-wave signals having a magnitude between Vss and Vpp.

7. The charge pump circuit of claim 5 wherein the charge pump circuit is implemented in a CMOS process having a P-type substrate, and wherein said first, second, third, fourth, and fifth MOS transistors are PMOS transistors each residing in an N-type well that forms a bulk region of each PMOS transistor, respectively, and wherein a bulk terminal of each of said first, second, third, and fifth MOS transistors couples to said first source/drain terminal of its MOS transistor, respectively.

8. The charge pump circuit of claim 7 wherein a bulk terminal of said fourth MOS transistor couples to a switch that switches between ground and said negative power supply Vss in response to clock signals derived from said clock signals.

9. The charge pump circuit of claim 8 wherein said switch comprises:
   a first NMOS transistor having a first source/drain terminal coupled to said bulk terminal of said fourth MOS transistor, a second source/drain terminal coupled to ground, and a gate terminal coupled to an inverse of said first clock signal; and
   a second NMOS transistor having a first source/drain terminal coupled to said bulk terminal of said fourth MOS transistor, a second source/drain terminal coupled to said negative power supply Vss, and a gate terminal coupled to an inverse of said second clock signal.

10. The charge pump circuit of claim 4 further comprising a buffer circuit having an input terminal coupled to said first clock signal and an output terminal coupled to said gate terminal of said third MOS transistor, said buffer circuit comprising:
    a first inverter having an input terminal coupled to said input terminal of said buffer circuit, an output terminal, a positive power supply terminal coupled to said reference voltage, and a negative power supply terminal coupled to said negative power supply Vss; and
    a second inverter having an input terminal coupled to said output terminal of said first inverter, an output terminal coupled to said gate terminal of said third MOS transistor, a positive power supply terminal coupled to said positive power supply Vdd or ground, and a negative power supply terminal coupled to said negative power supply Vss.

11. In a CMOS process having a P-type substrate, a negative charge pump circuit having a first positive power supply Vdd, a negative power supply Vss, and a second positive power supply Vpp that is greater in voltage than said first positive power supply Vdd, and wherein the P-type substrate couples to Vss, the negative charge pump circuit comprising:
    a first PMOS transistor having a first source/drain terminal and a bulk terminal both coupled to Vpp, a gate terminal coupled to a first clock signal, and a second source/drain terminal;
    a second PMOS transistor having a first source/drain terminal and a bulk terminal both coupled to said second source/drain terminal of said first PMOS transistor, a gate terminal coupled to a second clock signal, and a second source/drain terminal coupled to ground;
    a third PMOS transistor having a first source/drain terminal and a bulk terminal both coupled to ground, a gate terminal coupled to said first clock signal, and a second source/drain terminal;
    a first capacitor coupled between said second source/drain terminal of said first PMOS transistor and said second source/drain terminal of said third PMOS transistor;
    a fourth PMOS transistor having a first source/drain terminal coupled to said second source/drain terminal of said third PMOS transistor, a gate terminal coupled to a drive circuit, a bulk terminal that switchably couples to one of Vss or ground, and a second source/drain terminal coupled to an output of the charge pump circuit; and
    a second capacitor coupled between said output of the charge pump circuit and ground,
    wherein, said drive circuit ensures that said fourth PMOS transistor is turned on in response to said first and second clock signals.

12. The negative charge pump circuit of claim 11 wherein said first and second clock signals are non-overlapping complementary square-wave signals having a magnitude between Vss and Vpp.

13. The negative charge pump circuit of claim 12 wherein said bulk terminal of said fourth PMOS transistor couples to ground in response to an inverse of said first clock signal, and couples to Vss in response to an inverse of said second clock signal.

14. A transmission line termination circuit comprising:
    a termination switch comprising a PMOS transistor having a first source/drain terminal coupled to a first transmission port via a first termination resistor, a second source/drain terminal coupled to a second transmission port via a second termination resistor, and a gate terminal;
    a PMOS pull-up transistor having a first source/drain terminal coupled to a positive power supply voltage, a second source/drain terminal coupled to said gate terminal of said PMOS transistor of said termination switch, and a gate terminal coupled to a control signal; and
    a negative charge pump circuit having an input coupled to receive said control signal, and an output coupled to said gate terminal of said PMOS transistor of said termination switch,
    wherein, said negative charge pump circuit generates at its output a voltage more negative than a substrate voltage Vss in the circuit where said substrate cannot be pumped to more negative than Vss.

15. The transmission line termination circuit of claim 14 wherein said negative charge pump circuit comprises:
    a first PMOS transistor having a first source/drain terminal coupled to said positive power supply voltage, a gate terminal coupled to a first clock signal, and a second source/drain terminal;

a second PMOS transistor having a first source/drain terminal coupled to said second source/drain terminal of said first PMOS transistor, a gate terminal coupled to a second clock signal, and a second source/drain terminal coupled to ground;

a third PMOS transistor having a first source/drain terminal coupled to ground, a gate terminal coupled to said first clock signal, and a second source/drain terminal;

a first capacitor coupled between said second source/drain terminal of said first PMOS transistor and said second source/drain terminal of said third PMOS transistor; and a fourth PMOS transistor having a first source/drain terminal coupled to said second source/drain terminal of said third PMOS transistor, a gate terminal coupled to a drive circuit, and a second source/drain terminal coupled to an output of the charge pump circuit.

16. The transmission line termination circuit of claim 15 wherein said fourth PMOS transistor has a bulk terminal that is switchably coupled between ground and the substrate voltage Vss.

17. The transmission line termination circuit of claim 15 wherein said driver circuit comprises a bootstrapping capacitor coupled to receive said second clock signal, and a level shift capacitor coupled between said bootstrapping capacitor and ground.

18. A charge pump circuit comprising:

a first MOS transistor having a first source/drain terminal coupled to a reference voltage, a gate terminal coupled to a first clock signal, and a second source/drain terminal;

a second MOS transistor having a first source/drain terminal coupled to said second source/drain terminal of said first MOS transistor, a gate terminal coupled to a second clock signal, and a second source/drain terminal coupled to ground;

a third MOS transistor having a first source/drain terminal coupled ground, a gate terminal coupled to said first clock signal, and a second source/drain terminal;

a first capacitor coupled between said second source/drain terminal of said first MOS transistor and said second source/drain terminal of said third MOS transistor; and a fourth MOS transistor having a first source/drain terminal coupled to said second source/drain terminal of said third MOS transistor, a gate terminal coupled to a drive circuit, and a second source/drain terminal coupled to an output of the charge pump circuit, wherein, the driver circuit comprises a bootstrapping capacitor coupled to receive said second clock signal, and a voltage shift capacitor coupled between said bootstrapping capacitor and ground.

* * * * *